United States Patent [19]
Yamanaka

[11] 3,993,352
[45] Nov. 23, 1976

[54] ENERGY ABSORBING DUMP TRUCK BODY

[75] Inventor: Akira Yamanaka, Yokohama, Japan

[73] Assignee: Mitsubishi Jidosha Kogyo Kabushiki Kaisha, Japan

[22] Filed: Sept. 17, 1974

[21] Appl. No.: 506,796

[52] U.S. Cl. .......................... 298/20 R; 180/82 R; 188/1 C; 293/5; 296/35 R; 298/1 R; 180/91
[51] Int. Cl.² ................... B60R 21/02; B60P 1/28
[58] Field of Search ............... 180/82 R, 89 R, 103, 180/91, 94, 100; 293/5; 296/35 R, 35 A, 28 M, 65 A; 298/1 R, 20 R; 188/1 C

[56] References Cited
UNITED STATES PATENTS

| | | | |
|---|---|---|---|
| 2,355,528 | 8/1944 | Harper | 296/35 R |
| 2,929,637 | 3/1960 | Papacosta | 180/82 R |
| 2,959,446 | 11/1960 | Thompson | 296/65 A |
| 2,978,273 | 4/1961 | Racine | 296/65 A |
| 2,993,732 | 7/1961 | Walker | 296/65 A X |
| 3,671,068 | 6/1972 | Gerhard | 180/82 R X |
| 3,831,998 | 8/1974 | Hewitt | 180/91 X |
| 3,851,722 | 12/1974 | Grosseau | 180/82 R |
| 3,861,736 | 1/1975 | Rossler | 296/28 M |

FOREIGN PATENTS OR APPLICATIONS

| | | | |
|---|---|---|---|
| 1,122,195 | 9/1956 | France | 296/65 A |
| 540,464 | 3/1956 | France | 296/65 A |
| 647,373 | 10/1962 | Italy | 180/91 |

*Primary Examiner*—Kenneth H. Betts
*Assistant Examiner*—John P. Silverstrim
*Attorney, Agent, or Firm*—Robert E. Burns; Emmanuel J. Lobato; Bruce L. Adams

[57] ABSTRACT

A dump truck has a carrier that is placed on its body frame so as to be longitudinally movable thereon when longitudinal impact force exceeding a given value works on the truck's body. Energy absorbing means are interposed between said frame and carrier, for absorbing kinetic energy of said carrier by the use of hydraulic pressure produced by the relative displacement therebetween.

11 Claims, 10 Drawing Figures

ENERGY ABSORBING DUMP TRUCK BODY

BACKGROUND OF THE INVENTION

The present invention relates to a truck that is designed to absorb impact force imposed on its driver at the time of collision.

Conventional energy absorbing devices of trucks, such as bumpers, for protecting the driver from collision have been unable to substantially absorb the energy engendered by collision unless they were made considerably larger in size than those for passenger cars etc. because of the greatness of their total deadweight. Also, different from passenger cars etc., kinetic energy added by the carrier and freights loaded thereon has been too great for the collision energy absorbing ability inherently exhibited by the chassis or body frame through their plastic deformation. As a consequence, negative acceleration G, which works on the driver when the truck collides, has increased to such an extent that might endanger the safety of the driver.

SUMMARY OF THE INVENTION

This invention provides a truck which eliminates the aforesaid shortcomings particularly a dump truck. A truck according to this invention has a carrier that is placed on its body frame so as to be longitudinally movable thereon when longitudinal impact force exceeding a given value works on its body, and energy absorbing means, interposed between said frame and carrier and combined with the dump truck mechanism, for absorbing kinetic energy of said carrier by the use of hydraulic pressure produced by the relative displacement therebetween. Therefore, when this truck collides against some obstacle or the like and the resultant impact force exceeds a given value, the carrier longitudinally slides over the frame, whereupon considerable percentage of kinetic energy produced by the movement of said carrier, which accounts for about a half of the total deadweight of the truck, and freights loaded thereon is absorbed by said energy absorbing means. As a result, kinetic energy of other parts of the truck than said carrier and freights on it, that is, a cab, said frame and a driver works lineally on the obstacle, thereby reducing kinetic energy working on the frame and energy buffering means, such as bumpers, provided in front and rear of the truck. This reduced kinetic energy can effectively be absorbed by said frame and energy buffering means, resulting in a substantial decrease in negative acceleration G working on the driver, compared with collision of a conventional truck wherein its total deadweight is involved. This is conductive to ensuring the safety of the driver. Also, as previously described, kinetic energy produced by the movement of the carrier and freights thereon over the frame is effectively absorbed by said energy absorbing means, thus reducing impact energy working on the frame. Accordingly, bumpers or other energy buffering means can be made smaller, compared with those of the conventional trucks whose carriers do not move.

BRIEF DESCRIPTION OF THE DRAWINGS

Now several embodiments of this invention will be described in detail with reference to the accompanying drawings, in which.

Like reference numerals denote similar parts throughout the different views of the drawings.

DESCRIPTION OF PREFERRED EMBODIMENTS

Figure 1:
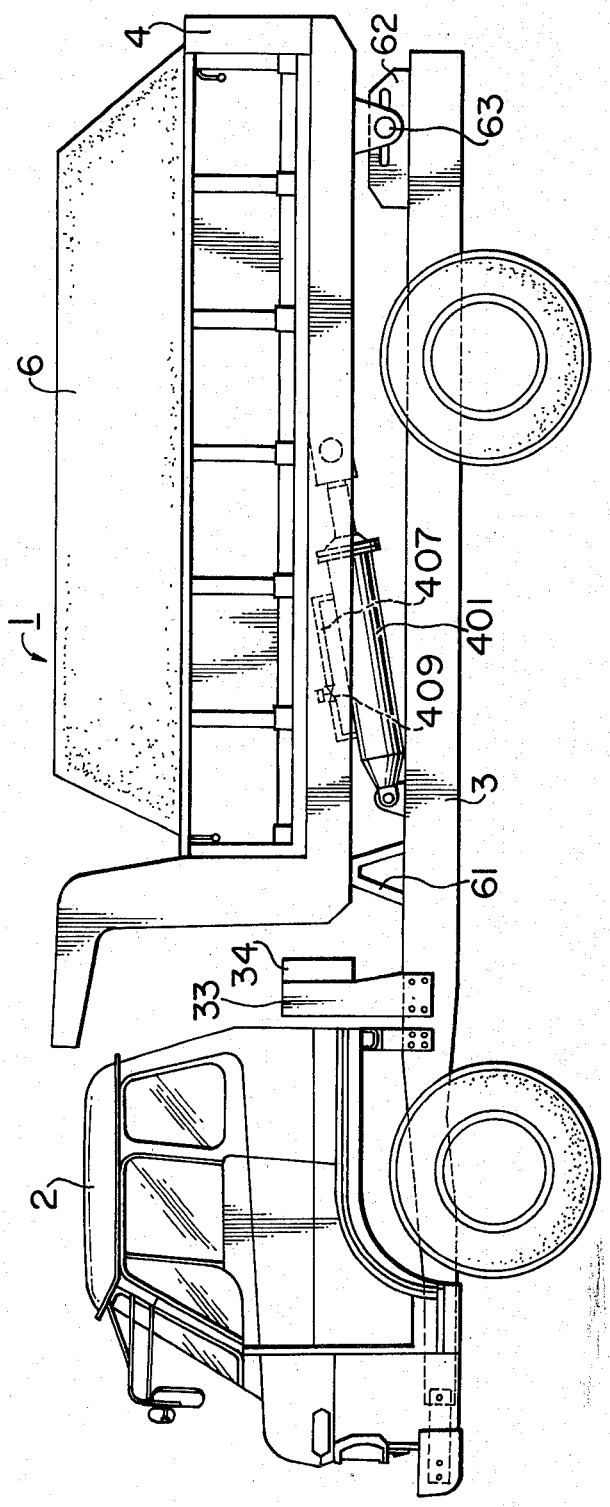
FIG. 1 is a side elevation showing a first embodiment of this invention.

In a first embodiment of this invention illustrated in FIGS. 1 through 7, a dump truck 1 comprises a cab 2, a frame 3, a carrier 4 and a hoist cylinder 401. The cab 2 is firmly mounted on the frame 3. The front end of the carrier 4 is placed on a support base 61 fixed to the frame 3, while its rear end is pivotally fitted, by a support pin 63, to an energy absorbing plate 62 mounted on the frame 3. As may be evident from FIG. 2, the energy absorbing plate 62 is perforated with a slot 65 which extends to both sides of a pin hole 64 and is sufficiently smaller in width than the diameter of said support pin 63. Accordingly, when the carrier 4 tends to move under the influence of an impact force exceeding a given value, which results from the collision with an automobile etc., the support pin 63 moves back and forth expanding the slot 65, thereby absorbing the energy of impact.

Figure 2:
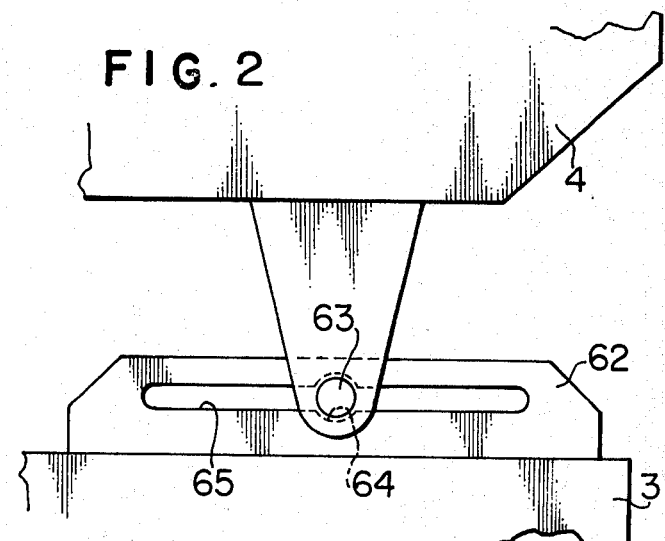
FIG. 2 is an enlarged side elevation of a detail from FIG. 1.
Figure 3:
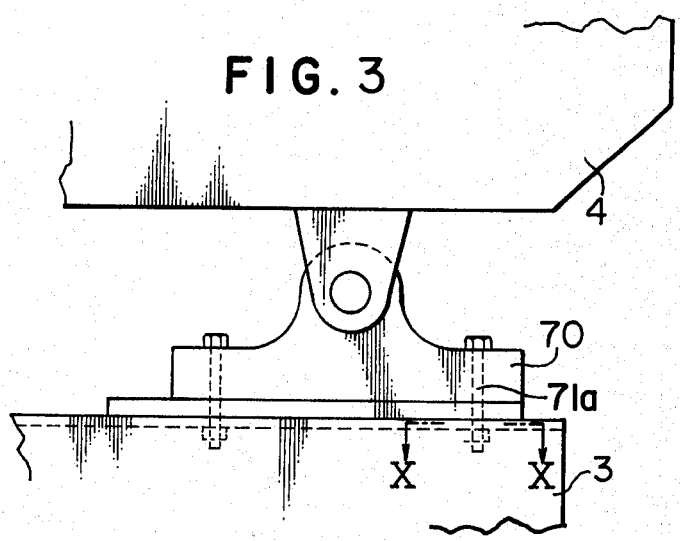
FIG. 3 shows a modification of FIG. 2.
Figure 4:
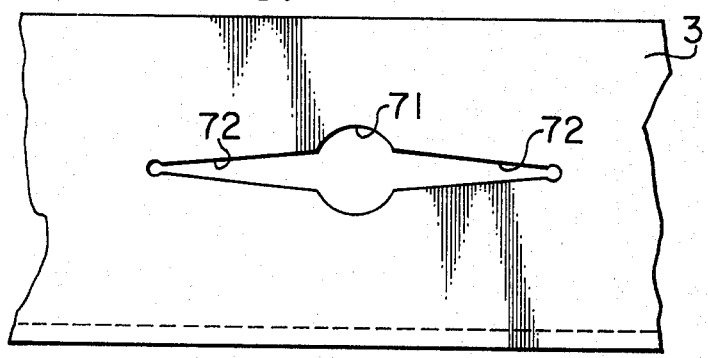
FIG. 4 is a view looking in the direction of the arrow X in FIG. 3.
Figure 5:
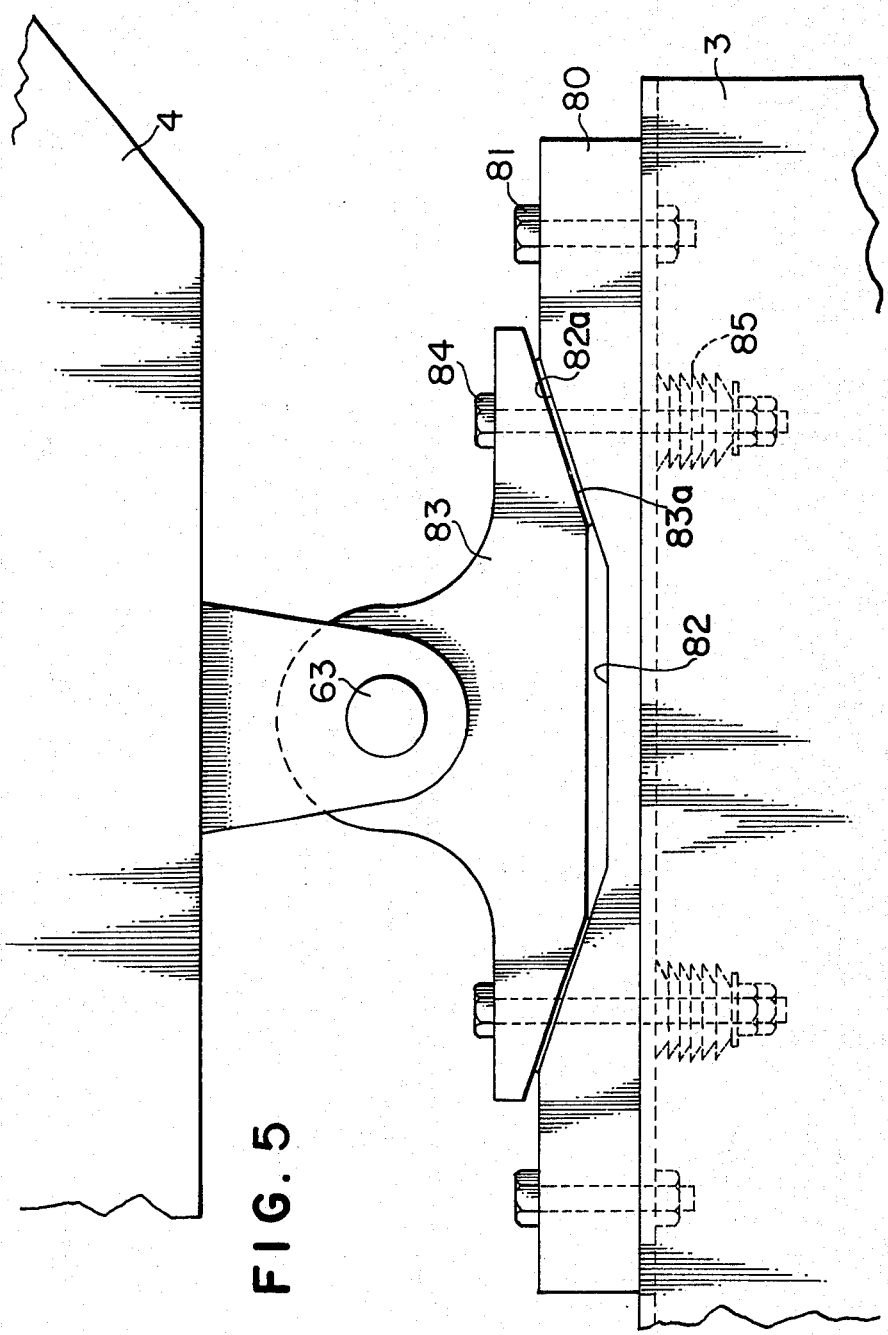
FIG. 5 shows another modification of FIG. 2.
Figure 6:
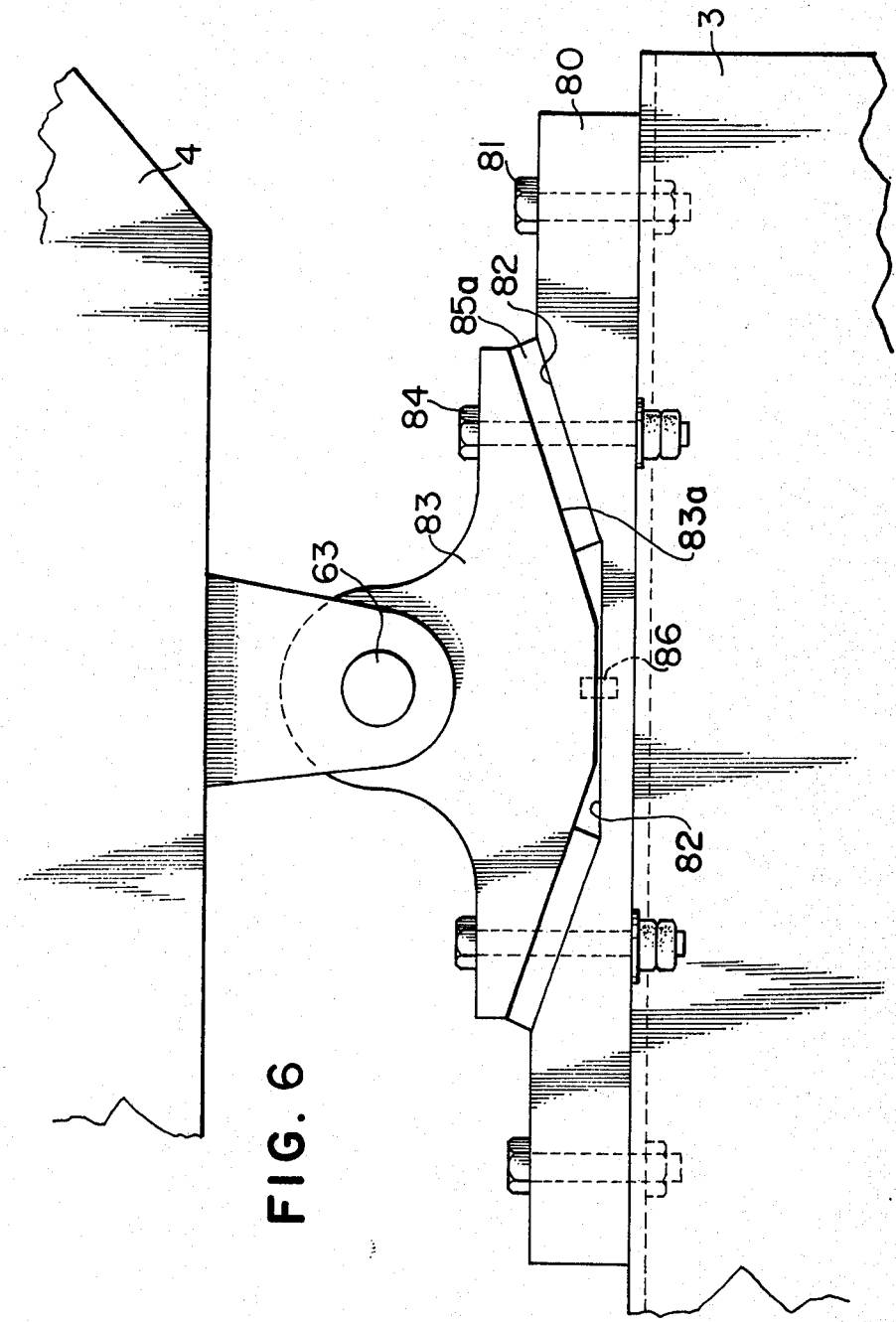
FIG. 6 shows a modified form of FIG. 5.

The pivotally supporting portion at the rear end of the carrier 4 may be designed also to such a construction as is shown in FIGS. 3 and 4, in addition to one in FIGS. 1 and 2. The carrier 4 is pivotally fitted by a support pin 63 to a support base 70 that is firmly bolted on the frame 3 by bolts 71a. Each bolt 71a passes through a hole 71 in the frame 3 which has an outwardly tapering slot 72 extending in both directions. Therefore, when an impact is given, the carrier can move back or forth, with the bolts expanding the slot 72. Another mechanism illustrated in FIG. 5 consists of a support plate 80 fastened to the frame 3 with bolts 81. This support plate is formed with a recessed portion 82 having inclined surfaces 82a on which is mounted a support base 83 having correspondingly inclined surfaces 83a is fastened to said support plate 80 and frame 3 with bolts 84 having counter-sunk springs 85 at their lower end. Because the carrier 4 is pivotally fitted to the support base 83 with a support pin 63, the support base 83 slides back or forth along said tapered surfaces over the indented portion 82 of the support plate 80 when the carrier 4 is caused to move backward or forward as a result of a collision. On such an occasion, the carrier 4 makes an upward displacement too, thereby pulling up said bolts 84 subjecting them to plastic deformation. Consequently, part of the kinetic energy of the carrier 4 is absorbed thereby. Also, the counter-sunk springs 85 interposed in the lower portion of the bolts 84 can relieve the initial impact force absorbed by said bolts 84. Furthermore, in a construction similar to one shown in FIG. 5, elastic pads 85a may be laid on the tapered surfaces of the recessed portion 82 of the support plate 80 on which the support base 83 is mounted, and a shear pin 86 may be provided at the bottom thereof, as illustrated in FIG. 6.

Figure 7:
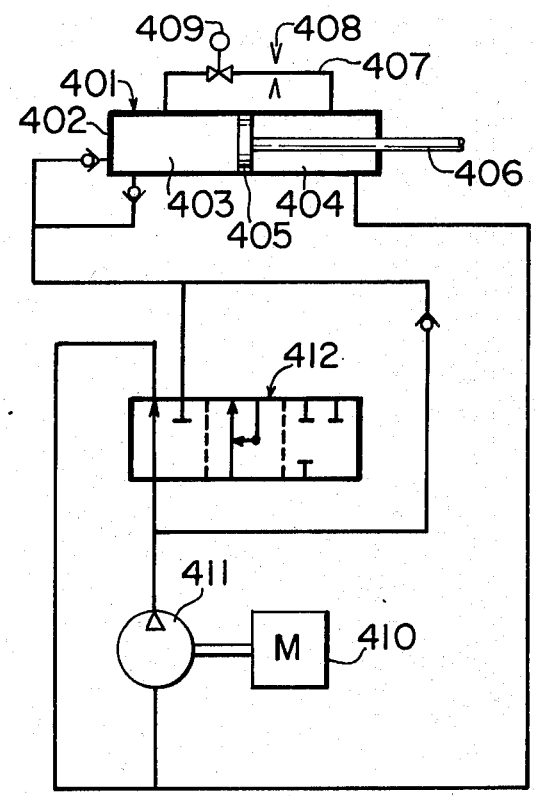
FIG. 7 is a hydraulic pressure system diagram for the embodiment of FIG. 1.

In FIG. 7, a hoist cylinder 401 for moving up and down the carrier 4 consists of a cylinder proper 402, a first oil chamber 403, a second oil chamber 404, a piston 405 and a connecting rod 406. The cylinder proper 402 is fitted to the frame 3, and divided by the piston 405, which is adapted to slide therein, into said first oil chamber 403 and second oil chamber 404. The connecting rod 406 fixed to the piston 405 is fitted to the carrier 4. A communication pipe 407, communicating said first and second oil chambers 403 and 404, is provided with a magnet valve 409 for opening and closing an orifice 408 and the communication pipe 407. For pushing up the carrier 4 to discharge its load, the driver operates an operating device not shown in the figure, so that said communication pipe 407 is closed by the action of said magnet valve 409. By the combined operation of a motor 410, a hydraulic pump 411 and a hydraulic control device 412, pressurized oil is introduced into the first oil chamber 403 to move the piston to the right, whereupon the hoist cylinder 401 pushes up the carrier. When the carrier 4 is in a horizontal position, that is, the hydraulic pump 411 etc. are not at work, the magnet valve 409 is opened, and, therefore, so is the communication pipe 407.

When some other vehicle collides with the carrier 4 of a dump truck 1 of the above-described construction, and an impact force working thereon exceeds a given value, the support pin 63 moves forward, causing plastic deformation of the slot 65 in the energy absorbing plate 62, especially in an embodiment shown in FIGS. 1 and 2. With this movement, the carrier 4 also moves forward, which, in turn, causes the piston 405 fixed to the connecting rod 406 to move in the forward direction. This forward movement of the piston 405 passes the oil in the first oil chamber 403 to the communication pipe 407, and thence to the second oil chamber 404 through the orifice 408. The fluid resistance produced when the oil passes through said orifice 408 absorbs part of the kinetic energy imposed on the carrier 4. Also, the kinetic energy of the carrier 4 is absorbed by the support pin 63, fitted on either side thereof, that moves through the slot 65 in the energy absorbing plate 62, giving rise to plastic deformation thereof.

That is, the kinetic energy imposed on the carrier 4 by such collision is absorbed by the fluid resistance produced at the orifice 408 by the oil passing from the first oil chamber 403 to the second oil chamber 404 of the hoist cylinder 401, and by the support pin 63 and the energy absorbing plate 62. By this means, negative acceleration G working on the driver, as a result of the collision, can be reduced.

When a vehicle etc. collides with the rear portion of the frame 3 of this dump truck 1, the carrier 4 tends to move backward over the frame 3 under the influence of impact force. Then its impact energy is absorbed by the same action as described above.

Figure 8:
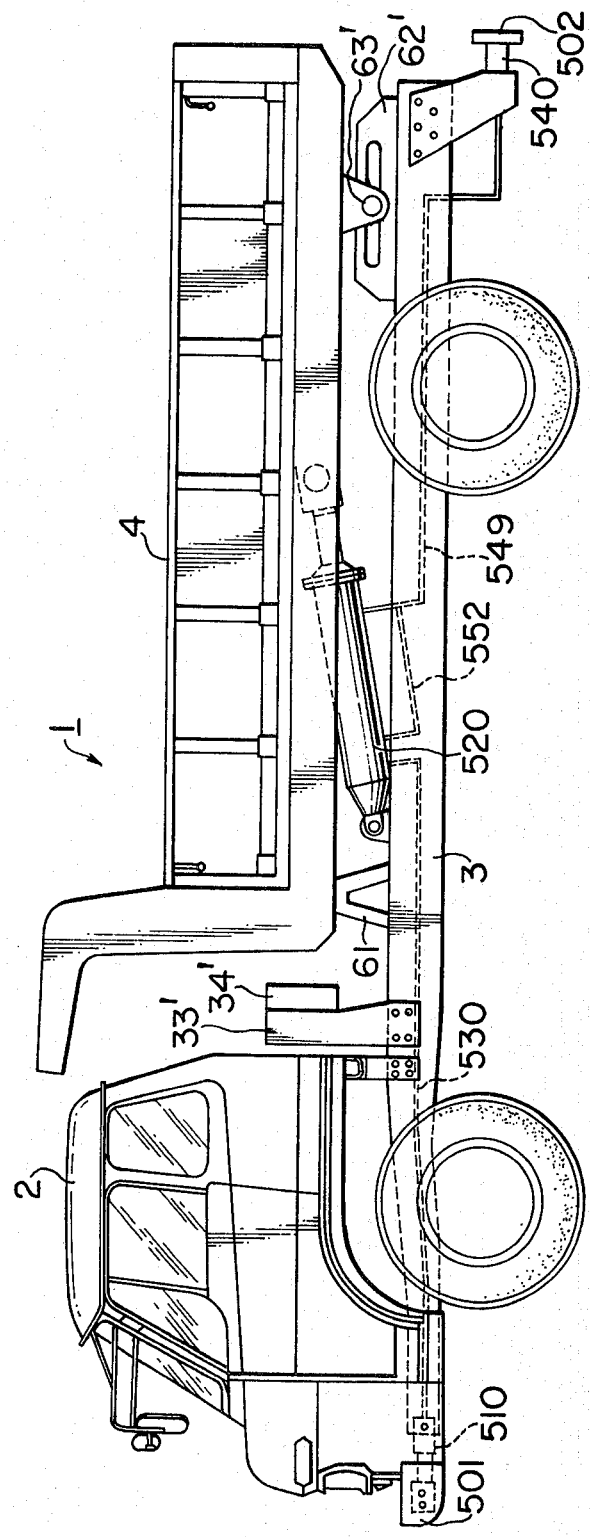
FIG. 8 is a side elevation showing a second embodiment of this invention.
Figure 9:
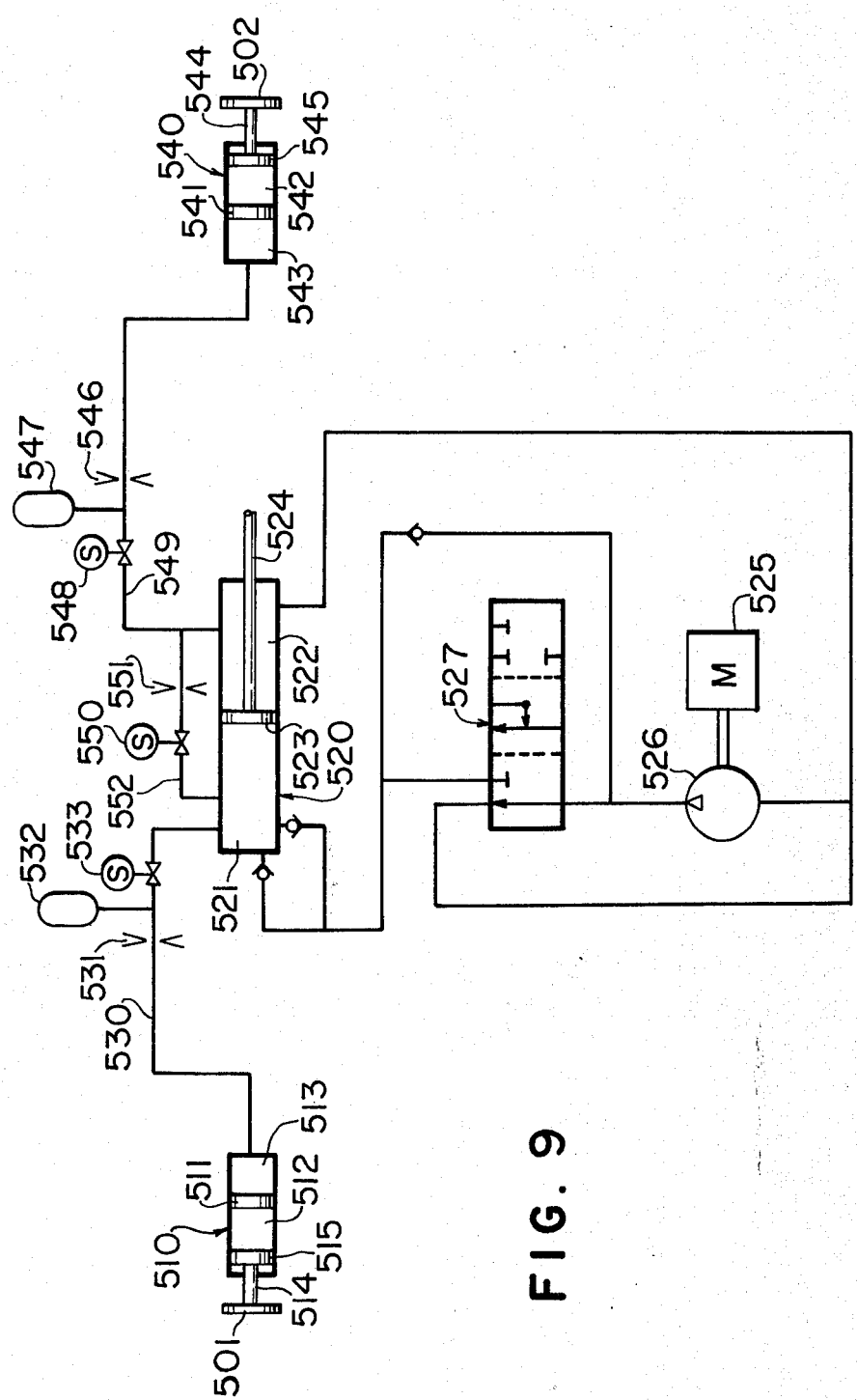
FIG. 9 is a hydraulic pressure system diagram for the embodiment of FIG. 8.
Figure 10:
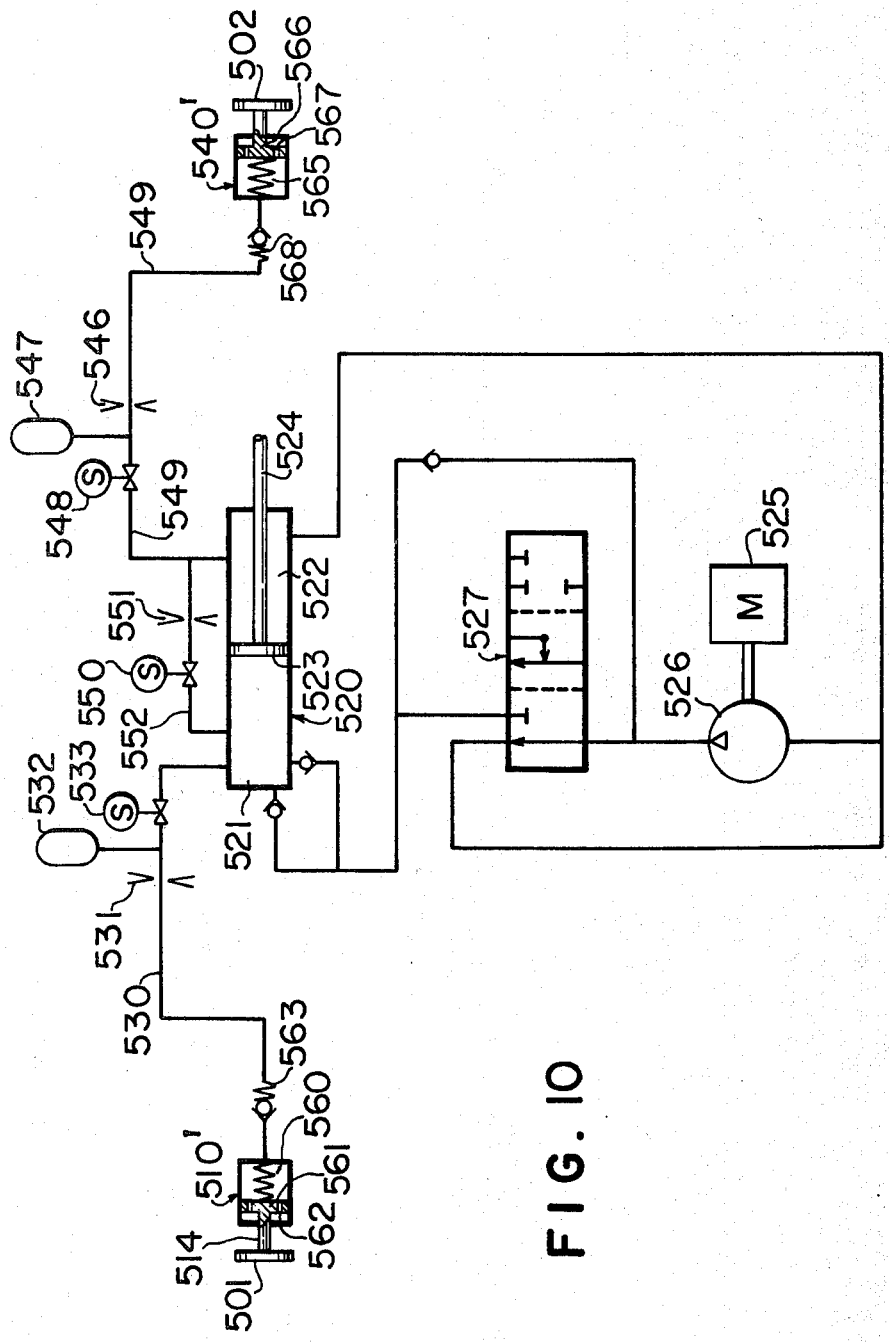
FIG. 10 shows a modification of FIG. 9.

In a second embodiment illustrated in FIGS. 8 through 10, a dump truck 1 comprises a cab 2, a frame 3, a front bumper 501, a first hydraulic cylinder 510, a carrier 4, a hoist cylinder 520, a rear bumper 502 and a second hydraulic cylinder 540. The cab 2 is fixed on the frame 3. The first hydraulic cylinder 510 fixed to the frame 3 is divided, by a piston 511 fitted therein, into a first chamber 512 and a second chamber 513. Said first chamber 512 is fitted with a piston 515 connected with a connecting rod 514, and also filled with gas or interposed with a coil spring between the two pistons 515 and 511. The second chamber 513 is a hydraulic chamber filled with oil. The front end of said connecting rod 514 is fixed to the front bumper 501. The carrier 4 is mounted on a support base 61 fixed to the frame 3 at its front end, and pivotally supported, with a support pin 63', on an energy absorbing plate 62' fixed on the frame 3 at its rear end, as in the previously described embodiment of FIG. 2. The hoist cylinder 520 placed between the frame 3 and the carrier 4 consists of a first oil chamber 521, a second oil chamber 522, a piston 523, a connecting rod 524, a motor 525, a hydraulic pump 526 and a hydraulic control device 527. The first oil chamber 521 is connected to the second oil chamber 513 of said first hydraulic cylinder 510 by a communication pipe 530 having an orifice 531, an accumulator 532 and a magnet valve 533. The second oil chamber 522 is separated by the piston 523 from the first oil chamber 521. Said piston 523 is fitted to the carrier 4 through the connecting rod 524. The second hydraulic cylinder 540 is divided, by a piston 541 fitted therein, into a first chamber 542 and a second chamber 543. Said first chamber 542 is fitted with a piston 545 connected with a connecting rod 544, and either filled with gas or interposed with a coil spring between the two pistons 545 and 541. The second chamber 543 becomes a hydraulic chamber filled with oil, and is connected to the second oil chamber 552 of the hoist cylinder 520 by a communication pipe 549 having an orifice 546, an accumulator 547 and a magnet valve 548. The first oil chamber 521 of said hoist cylinder 520 and the communication pipe 549 are connected by a communication pipe 552 having a magnet valve 550 and an orifice 551. To the other end of said connecting rod 544 is fixed the rear bumper 502.

For raising the carrier 4 of the dump truck 1 of the above-described construction to discharge its load therefrom, the hydraulic control device 527 of the hoist cylinder 520 is operated to first close the magnet valves 528, 550 and 548, thereby closing the communication pipes 530, 552 and 549, respectively. Consequently, the piston 523 is moved to the right, and the carrier 4 is tilted to discharge its load. Then, said hydraulic control device 527 is operated to lower the carrier 4 back to its original position. When the hoist cylinder 520 is not at work, said magnet valves 528, 550 and 548 and respective communication pipes are opened. When some other vehicle collides against the front bumper 501 of this dump truck 1, thereby imposing an impact force exceeding a given value on the carrier 4, the front bumper 501 first moves to the right, thereby causing the piston 515 in the first hydraulic cylinder 510 to move in the right direction, too. This rightward movement compresses the gas or coil spring in the first chamber 512, thus absorbing part of the impact energy. When the piston 511 is pushed to the right, oil in the second chamber 513 flows into the first oil chamber 521 of the hoist cylinder 520 through the communication pipe 530. Then, part of the kinetic energy working on said front bumper 501 is absorbed by the fluid resistance produced by the orifice formed in the communication pipe 530 and the buffering action of the accumulator 532. The kinetic energy of the oil flowing into said first oil chamber 521 moves the piston 523 to the right, which movement, in turn, causes the carrier 4 to move rightward. The kinetic energy of this carrier 4 is absorbed by the plastic deformation of the energy absorbing plate 62' that is produced by the support pin 63' fitted to said carrier 4. Part of the oil flowing into said first oil chamber 521 passes into the communication pipe 552, whereby part of its kinetic energy is absorbed at the orifice 551. By the rightward movement of said piston 523, oil in the second oil chamber 522 flows through the communication pipe 549 into the second chamber 543 of the second hydraulic cylinder 540. Then, part of the kinetic energy of the oil flowing into the second chamber 543 is absorbed by the fluid resistance at the orifice 546 provided in said communication pipe 549 and the buffering action of the accumulator 547. The oil flowing into said second chamber 543 moves the piston 541 to the right to compress the gas or coil spring in the first chamber 542, thereby absorbing part of the kinetic energy of said oil.

As may be understood from the above, the kinetic energy of the vehicle colliding against the front bumper 501 is absorbed by the combination of the compression resistance of the gas or coil spring within the first chambers 512 and 542 of the hydraulic cylinders fitted to the front and rear bumpers, the fluid resistance at the orifices 531, 551 and 546, the buffering action of the accumulators 532 and 547, and the plastic deformation of the energy absorbing plate 62' caused by the support pin 63' fitted to the carrier 4. The energy produced by impact is thus absorbed gradually first and then, eventually, to a sufficient degree. Therefore, the impact force working on the driver can be substantially reduced.

Instead of the first and second hydraulic cylinders 510 and 540 fitted to said front and rear bumpers 501 and 502, such a first hydraulic cylinder 510' and a second hydraulic cylinder 540' as illustrated in FIG. 10 may be provided. To be more precise, the first hydraulic cylinder 510' is fitted with a piston 561 in an oil chamber 560, which communicates with a communication pipe 530. Said piston 561, having orifices 562, is connected to the front bumper 501 through a connecting rod 514. The communication pipe 530 near the oil chamber 560 is provided with a limiting valve 563. The second hydraulic cylinder 540' is fitted with a piston 566 in its oil chamber 565 communicating with a communication pipe 549. Said piston 566, having orifices 567, is connected to the rear bumper 502 through a connecting rod 544. The communication pipe 549 near the oil chamber 565 is provided with a limiting valve 568.

Composed as described above, this dump truck 1 can achieve the same buffering effect not only when it collides head-on, but also when it is collided from behind or collides with some obstacle when it is moving backward.

What is claimed is:

1. A dump truck, comprising:
a frame; a dump body; means pivotally mounting said dump body on said frame for movement between a normal horizontal position and an inclined, dumping position, said mounting means including means allowing said dump body to slide longitudinally of said frame in response to a predetermined impact force, while absorbing kinetic energy; a hoisting unit for moving said body between said horizontal and inclined positions, said unit comprising a cylinder pivotally connected to one of said frame and said body, a piston slidably mounted within said cylinder, a rod connected to said piston, extending from said cylinder and pivotally connected to the other of said frame and said body, said piston dividing said cylinder into first and second fluid chambers, means defining a passage interconnecting said first and second chambers, and means for selectively closing said passage, whereby when said passage is opened and said dump body slides longitudinally of said frame, fluid passes between said first and second chambers, the fluid resistance of said passage absorbing kinetic energy.

2. A dump truck according to claim 1 in which said means allowing said dump body to slide longitudinally includes a pivot means disposed for frictional reaction to the longitudinal sliding of the dump body.

3. A dump truck according to claim 2 in which the pivot means comprises a pin secured to one of said dump body and said frame; and a structure which is part of the other of said dump body and said frame and which defines a relatively narrow slot and a relatively wide pin hole disposed in said slot so that normally the pin is pivoted in the pinhole and that upon said impact the pin can slide along the narrow slot, disturbing the structure and thereby absorbing impact energy.

4. A dump truck according to claim 2 in which the pivot means includes a pivot member; bolts for securing said member to a part of said dump body and said frame; and a structure at said part, defining bolt holes and a slot extending from said bolt holes and disposed so that normally one of the bolts extends through one of the bolt holes and that upon said strong impact the bolt can slide along the slot, distorting the structure and thereby absorbing impact energy.

5. A dump truck according to claim 2 in which the pivot means includes a first pivot support member secured to one of said dump body and said frame and having inclined surfaces; a second pivot support member secured to the other of said dump body and said frame and recessed with correspondingly inclined surfaces to engage the first member; and connector means interconnecting said members, subject to frictional sliding of one of said members relative to the other, along said inclined surfaces.

6. A dump truck according to claim 5 in which the connector means comprises bolts passing through said members, and bolt springs for causing the bolts to resiliently press said members to one another.

7. A dump truck according to claim 5 in which the connector means comprises an elastic pad interposed between one of the inclined surfaces of the first pivot support member and the corresponding inclined surface of the second pivot support member.

8. A dump truck according to claim 1 in which said means for selectively closing said passage comprises a shut-off valve in said passage; and valve control means for selectively opening and closing said valve depending on whether the dump body is or is not in its normal horizontal position.

9. A dump truck according to claim 1, additionally including shock absorber means which comprise first and second hydraulic cylinders respectively, on front and rear ends of the frame; and hydraulic connections connecting the first and second hydraulic cylinders, respectively, to the first and second chambers of the cylinder of the hoisting unit.

10. A dump truck according to claim 1 in which the frame has a front bumper and a rear bumper and a first cylinder secured to the front bumper and a second cylinder secured to the rear bumper, each of the first and second cylinders having a piston member slidable therein, upon front and rear impacts, respectively; and means defining passages interconnecting the first and second cylinders, respectively, with the first and second chambers of the cylinder of the hoisting unit, for transmitting a fluid pressure impulse to either of said chambers, from the respective one of the first and second cylinders upon the sliding of the respective piston member.

11. A dump truck according to claim 1, including stop means for limiting the longitudinal sliding of the dump body, at least in a forward position.

* * * * *